C. J. CHALFANT.
Churn.
No. 67,266.
Patented July 30, 1867.
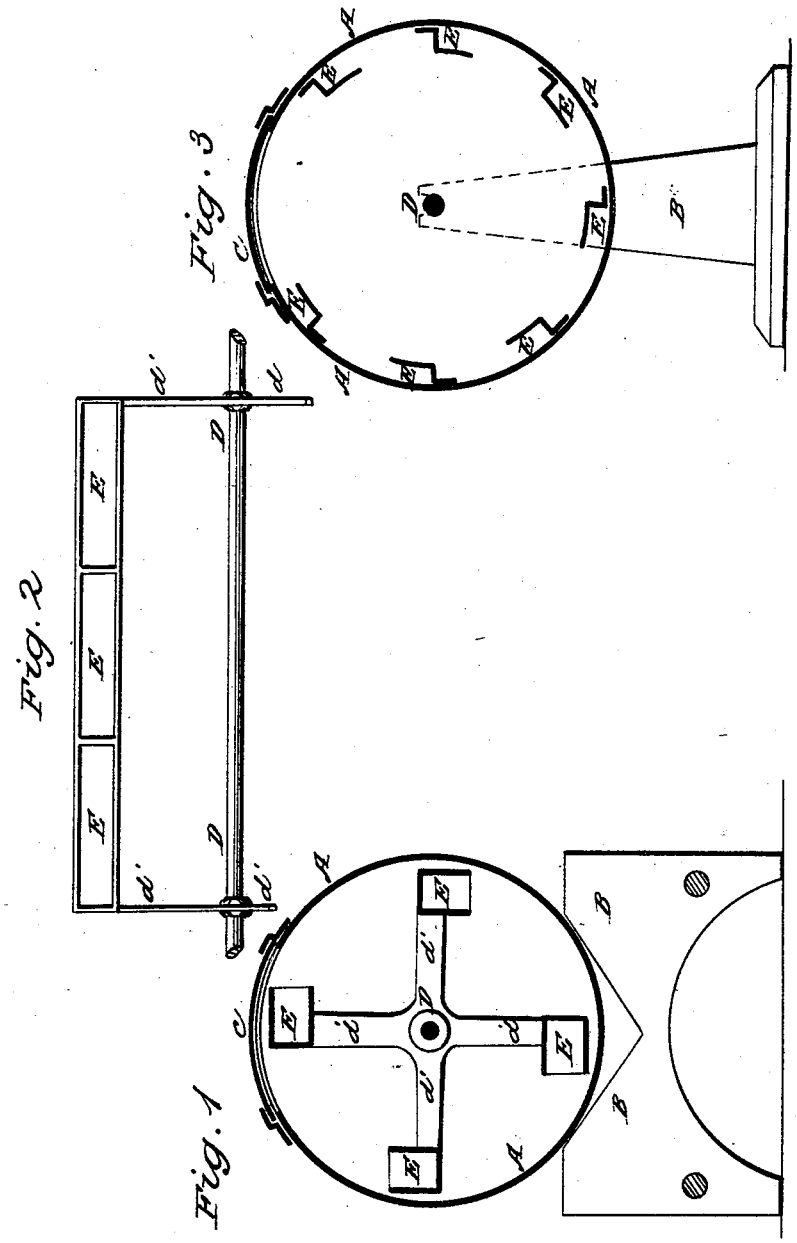
Witnesses:
Inventor:

United States Patent Office.

C. J. CHALFANT, OF UNIONVILLE, PENNSYLVANIA.

Letters Patent No. 67,266, dated July 30, 1867.

IMPROVEMENT IN CHURNS.

The Schedule referred to in these Letters Patent and making part of the same.

TO ALL WHOM IT MAY CONCERN:

Be it known that I, C. J. CHALFANT, of Unionville, in the county of Chester, and State of Pennsylvania, have invented a new and improved Churn; and I do hereby declare that the following is a full, clear, and exact description thereof, which will enable others skilled in the art to make and use the same, reference being had to the accompanying drawings, forming part of this specification, in which—

Figure 1 is a vertical cross-section of my improved churn.

Figure 2 is a detail sectional view of a part of the dasher.

Figure 3 is a vertical cross-section of a modification of my improved churn.

Similar letters of reference indicate like parts.

My invention has for its object to furnish an improved churn, so constructed and arranged that the air may be carried down beneath the cream, and the cream carried up and thrown through the air, thus throwing the milk into violent agitation in contact with the air, bringing the butter in a very short time; and it consists in attaching buckets or chambers to the dasher-arms, or to the sides of a barrel-churn, in the manner hereinafter more fully described.

A is the body of a barrel or cylindrical churn, which rests upon a support, B, as shown in fig. 1. C is the door or opening in the upper part of the churn, through which the cream is put into the churn, and the butter and buttermilk removed from it. D is the dasher-shaft, which passes in through the ends of the churn, and which is operated by a crank, or by any other convenient means. To the ends of the radial arms $d'$ of the dasher-shaft D are attached buckets or chambers E, which, as the dasher-shaft is revolved, pass alternately beneath and above the cream, passing down filled with air, which they allow to escape through the cream, and passing up filled with cream, which they discharge through the air, thus thoroughly intermingling the air and cream, at the same time that the cream is violently agitated by the passage of the said buckets through it. This same thing may be accomplished by attaching the chambers or buckets E to the inner sides of the body A of the churn. In this case the body A of the churn is attached to the shaft D, so as to be revolved by the revolution of said shaft, which revolves in the supports B, as shown in red in fig. 3.

I claim as new, and desire to secure by Letters Patent—

The right-angular buckets E, secured to the inner circumference of the revolving cylindrical churn $c$, in the direction of its length, substantially as described for the the purpose specified.

C. J. CHALFANT.

Witnesses:
GEORGE PYLE,
WM. P. BLAIR.